Figure 3:
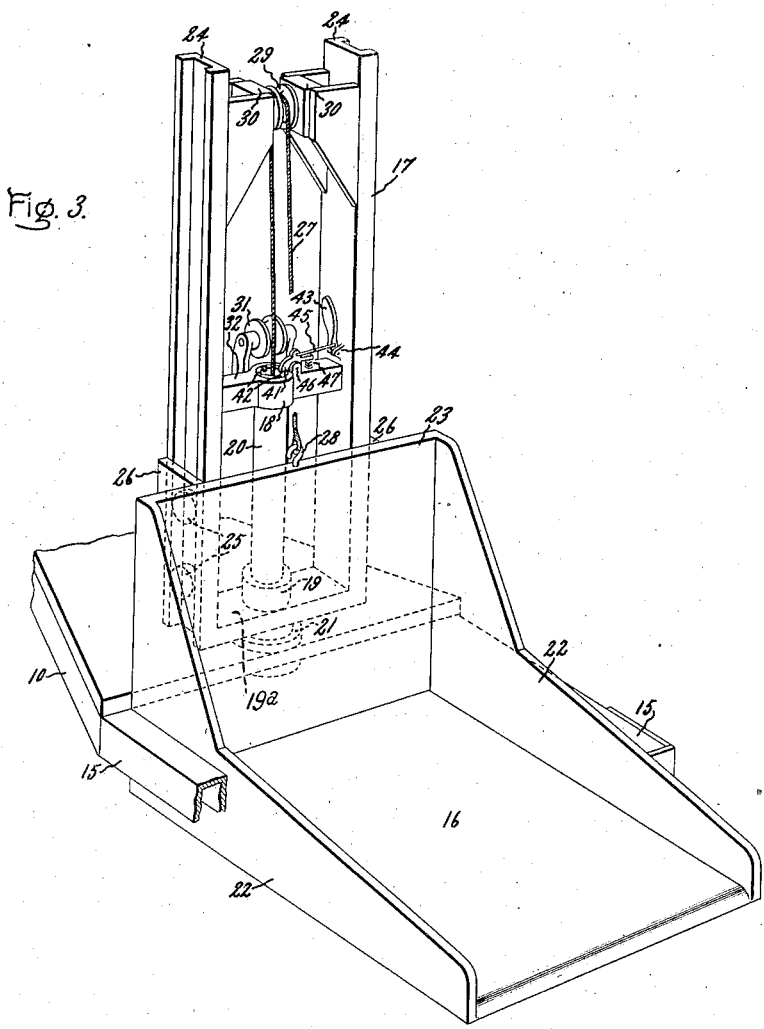

Oct. 23, 1934.　　　　F. ROESNER　　　1,978,170
MATERIAL HANDLING TRUCK
Filed July 12, 1933　　　2 Sheets-Sheet 1
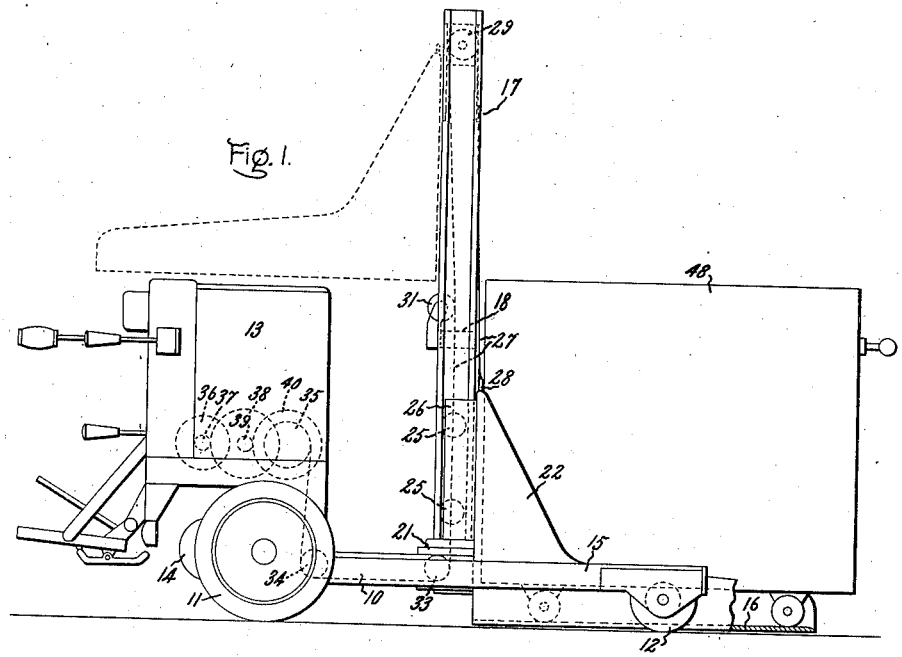
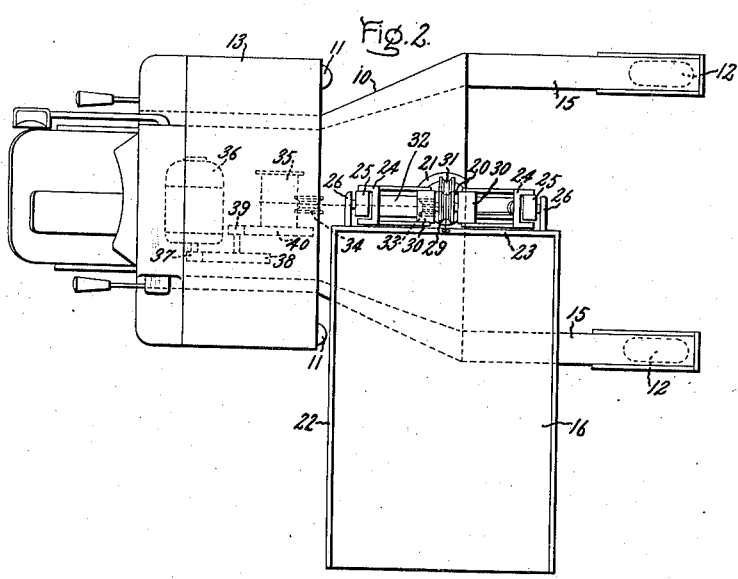
Inventor:
Friedrich Roesner,
by Harry E. Dunham
His Attorney.

Oct. 23, 1934.   F. ROESNER   1,978,170
MATERIAL HANDLING TRUCK
Filed July 12, 1933   2 Sheets-Sheet 2

Inventor:
Friedrich Roesner,
by Harry E. Dunham
His Attorney.

UNITED STATES PATENT OFFICE 1,978,170

MATERIAL HANDLING TRUCK

Friedrich Roesner, Hennigsdorf, Germany, assignor to General Electric Company, a corporation of New York Application July 12, 1933, Serial No. 680,108
In Germany August 31, 1932

12 Claims. (Cl. 187—9)

My invention relates to material-handling trucks having load-carrying platforms which may be raised or lowered.

Material-handling trucks of the above type are employed to load and unload railway cars, motor trucks, and the like which have platforms elevated from the ground on which the material-handling truck stands. In most cases these trucks must be arranged at right angles to the platform to be loaded, and in some instances it is impossible to arrange the truck in such position, as for example when it is desired to load a freight car from a low narrow platform, or when other cars are standing closely adjacent either side of the car to be loaded.

It is an object of my invention to provide an improved material-handling truck of simple and rugged construction and having a load-carrying platform which may be raised or lowered and which may be rotated to any desired position.

Another object of my invention is to provide a material-handling truck of the above type, provided with a load-carrying platform which may rest on the surface supporting the truck and which may be raised and rotated to any desired position.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawings, in which Fig. 1 is a side elevation of a material-handling truck embodying my invention; Fig. 2 is a plan view of the truck shown in Fig. 1 with the load-carrying platform raised and rotated 90 degrees; and Fig. 3 is a perspective view of a portion of the truck shown in Fig. 1, showing the arrangement of the supporting post and vertical guides.

In Fig. 1, I have shown a material-handling truck comprising an underframe 10 mounted on wheels 11 and 12 and provided with a storage battery and control box 13. A motor 14 energized by a storage battery in the box 13 and geared to the wheels 11 is provided to propel the truck. As can be seen in Fig. 2, the frame 10 is forked, it being provided with parallel arms 15 supported on the wheels 12. In accordance with my invention I provide a loading platform 16 arranged to be raised or lowered upon a vertical frame 17, which is rotatably mounted on upper and lower bearings 18 and 19 about a hollow post 20 provided with a base 21 and rigidly secured to the underframe 10 as is clearly shown in Fig. 3. The platform 16 is provided with sloping sides 22 and a back wall 23, and in its lower position it rests between the parallel arms 15 of the frame 10. In order that the platform 16 may readily be raised and lowered on the frame 17 I construct the sides of the frame of vertical parallel channels 24 secured together at their lower ends by a bearing bracket 19a and intermediate their ends by a bearing bracket 32. These channels form guides for rollers 25 which are pivotally mounted on plates 26 secured to the back 23 of the platform and engage the inner edges of the sides of the channels. The platform 16 can be raised and lowered by a cable 27 secured to a hook 28 on the back wall of the platform and passing over a pulley 29 mounted between brackets 30 at the top of the frame 17, then downwardly over a pulley 31 mounted on an upper bearing bracket 32, thence through the hollow post 20 and over pulleys 33 and 34 to a winding drum 35. The winding drum 35 is driven by a motor 36 which is connected thereto through a gearing comprising gears 37, 38, 39 and 40, and is energized by the battery in the box 13. When the platform 16 is raised above the level of the arms 15 of the underframe 10, it may be rotated about the hollow post 20. I provide a catch 41, secured to the bearing bracket 32 and arranged to engage any one of a plurality of slots or recesses 42 in the top of the post 20 to lock the platform 16 against rotation in the positions determined by the slots. The catch 41 may be released by pressing a handle 43 pivoted to the frame 17 at 44 and connected to the catch 41 by a link 45 which turns the catch about a pivot point 46 against the force of a compression spring 47. After the platform 16 has been rotated to one of the positions determined by the slots 42, the catch 41 will again engage a slot as the handle 43 is released and will retain the platform in the position to which it is rotated. As the platform 16 is raised to the top of the frame 17, it may be rotated 180°, as shown by the dotted lines in Fig. 1, as it will then clear the control box 13. It is possible to rotate the platform 16 through 360° without interfering with the operation of the raising and lowering mechanism, since the cable 27 passes down through the center of the hollow post 20.

In the operation of the material-handling truck described, the loading platform 16 is placed in its lower position, and a load such as a hand truck 48 is rolled onto the platform. The truck is run to the desired location, such as alongside a railroad car, and the motor 36 is then operated to raise the platform 16 to a level slightly above that of the railroad car platform, the catch 41 is released and the platform rotated until it is over the car platform, when it may be lowered until it rests on the car platform to permit the hand truck 48 to be rolled onto the railroad car. The catch 41 is then released and the platform 16 rotated to its initial position and lowered, and the truck can be loaded again.

It is evident that the positions to which the platform 16 may be rotated are not limited by the positions of the slots 42, but that the platform may be rotated to any position that may be required within 360°. It is thus possible to use the truck for loading and unloading in any position, provided there is room for the truck to approach the car or vehicle to be loaded within the distance which can be reached by the platform 16.

It is apparent from the foregoing that I have provided a material-handling truck of a simple construction, having a platform which may be raised or lowered and which may be rotated to any position when raised.

While I have described a type of material-handling truck constructed in accordance with my invention, modifications will occur to those skilled in the art. I do not, therefore, desire my invention to be limited to the structure shown and described, and I intend in the appended claims to cover all the modifications within the spirit and scope of my invention.

What I claim as new and desire to secure by Letters Patent of the United States is:

1. A truck including an underframe having a pair of spaced arms at one end thereof, a platform arranged to rest between said arms and upon the surface supporting said truck, a frame having vertical guides and rotatably mounted on said underframe, said platform being movable between an upper and a lower position on said frame, means for supporting and guiding said platform on the vertical guides of said frame, and means for raising and for lowering said platform.

2. A truck including an underframe having a pair of spaced arms at one end thereof, a platform arranged to rest between said arms and upon the surface supporting said truck, a vertical post rigidly secured to said underframe, a frame rotatably mounted on said post, said platform being carried by said frame and being movable between an upper and a lower position on said frame, and means mounted on said underframe for raising and for lowering said platform.

3. A truck including an underframe having a pair of spaced arms at one end thereof, a platform arranged to rest between said arms and upon the surface supporting said truck, a vertical post rigidly secured to said frame, a vertical frame journaled to rotate about said post, guides for said platform arranged on said vertical frame, and means for raising and lowering said platform on said guides, said paltform being rotatable with said vertical frame about said post when said platform is in its raised position.

4. A truck having an underframe, a vertical post rigidly secured to said underframe and having recesses at its upper end, a vertical frame journaled to rotate about said post, a load-carrying platform, guides for said platform arranged on said vertical frame, means mounted on said underframe for raising and lowering said platform on said guides, said platform being rotatable with said vertical frame about said post when said platform is in its raised position, and means co-operating with said recesses for retaining said platform in any one of a number of predetermined positions about said post.

5. A truck including an underframe having a pair of spaced arms at one end thereof, a load-carrying platform arranged to rest between said arms and upon the surface supporting said truck, a vertical post rigidly secured to said underframe and having recesses in its upper end, a vertical frame journaled to rotate about said post, guides for said platform arranged on said vertical frame, means for raising and lowering said platform on said guides, said platform being rotatable with said vertical frame about said post when said platform is in its raised position, and means cooperating with said recesses for retaining said platform in any one of a number of predetermined positions about said post.

6. A truck having an underframe, a vertical hollow post rigidly secured to said underframe and having recesses in its upper end, a vertical frame journaled to rotate about said post, a load-carrying platform, guides for said platform arranged on said vertical frame, and means including a cable passing through said hollow post and secured to said platform for raising and lowering said platform on said guides, said platform being rotatable with said vertical frame about said hollow post when said platform is in its raised position, and means cooperating with said recesses for retaining said platform in any one of a number of predetermined positions about said post.

7. A truck having an underframe, a vertical hollow post rigidly secured to said underframe, a vertical frame journaled to rotate about said post, means for locking said frame in any one of a number of predetermined positions about said post, a load-carrying platform, guides for said platform arranged on said vertical frame, means including rollers secured to said platform and engaging said guides for movably supporting said platform on said vertical frame, means including a cable passing through said hollow post and engaging said platform for raising and lowering said platform on said guides, and means including a pair of spaced arms secured to said underframe for retaining said platform and said frame against rotation when said platform is in its lowermost position.

8. A truck including an underframe having a pair of spaced arms at one end thereof, a loading platform arranged to rest upon the surface supporting said truck and between said arms, a hollow post rigidly secured to said underframe, a vertical frame including vertical guides mounted to rotate about said post, means on said platform engaging said guides for movably supporting said platform on said vertical frame, means mounted on said underframe and including a cable passing through said hollow post and having one end secured to said platform for raising and lowering said platform, said platform being rotatable with said vertical frame about said hollow post when said platform is raised from its position between said arms.

9. A truck having an underframe, a vertical post secured to said underframe, a load-carrying platform, means including a vertical frame and said post for movably securing said platform on said truck, said vertical frame including a pair of channels spaced apart, means including a bearing bracket at the lower end of said channels and a second bearing bracket intermediate the ends of said channels for rotatably mounting said vertical frame on said post, and means associated with said second bearing bracket for locking said frame and said platform against rotation in any one of a number of predetermined positions.

10. A truck having an underframe, a vertical post secured to said underframe, a vertical frame comprising a pair of channels, means including a bearing bracket at the lower end of said vertical frame and a second bearing bracket intermediate the ends of said frame for rotatably mounting said frame on said vertical post, a load-carrying platform, means including rollers secured to said platform and engaging said channels for movably supporting said platform on said vertical frame, and means associated with said second bearing bracket for locking said platform against rotation in any one of a number of predetermined positions.

11. A truck having an underframe, a vertical post secured to said underframe, a vertical frame comprising a pair of channels, means including a bearing bracket at the lower end of said vertical frame and a second bearing bracket intermediate the ends of said frame for rotatably mounting said frame on said vertical post, a load-carrying platform, means including rollers secured to said platform and engaging said channels for movably supporting said platform on said vertical frame, means including brackets between the upper ends of said channels and a pulley mounted between said brackets for raising and lowering said platform, and means associated with said second bearing bracket for locking said platform against rotation in any one of a number of predetermined positions.

12. A truck including an underframe, a vertical hollow post rigidly secured to said underframe, a vertical frame having a height greater than the height of said hollow post and rotatably mounted on said post, said vertical frame including a pair of vertical channels spaced apart and arranged on either side of said post, a lower bearing bracket engaging said post and secured to said channels at the lower ends thereof, an upper bearing bracket engaging said post and secured to said channels near the upper end of said post, a pulley mounted between said channels at the upper ends thereof, a load-carrying platform, means including rollers secured on said platform and engaging said channels for movably supporting said platform on said vertical frame, means mounted on said underframe and including a cable passing through said hollow post and over said pulley for raising and lowering said platform, and means engaging said upper bearing bracket and said post for locking said vertical frame in any one of a predetermined number of positions about said post.

FRIEDRICH ROESNER.